(12) United States Patent
Takahashi

(10) Patent No.: US 6,622,809 B2
(45) Date of Patent: Sep. 23, 2003

(54) BATTERY FIXING STRUCTURE OF A VEHICLE

(75) Inventor: Daisaku Takahashi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/038,450

(22) Filed: Jan. 3, 2002

(65) Prior Publication Data

US 2002/0093246 A1 Jul. 18, 2002

(30) Foreign Application Priority Data

Jan. 12, 2001 (JP) ........................... 2001-004383

(51) Int. Cl.[7] .................... B60K 1/04; B60R 16/04
(52) U.S. Cl. ..................................... 180/68.5
(58) Field of Search .................. 180/65.1, 68.5, 180/68.2

(56) References Cited

U.S. PATENT DOCUMENTS

| | | | | |
|---|---|---|---|---|
| 4,936,409 A | * | 6/1990 | Nix et al. | 180/68.5 |
| D321,856 S | * | 11/1991 | Whitley, II et al. | 180/68.5 |
| 5,222,711 A | * | 6/1993 | Bell | 180/68.5 |
| 5,585,205 A | * | 12/1996 | Kohchi | 180/68.5 |
| 5,620,057 A | * | 4/1997 | Klemen et al. | 180/68.5 |
| 6,085,854 A | * | 7/2000 | Nishikawa | 180/68.5 |
| 6,230,834 B1 | * | 5/2001 | Van Hout et al. | 180/68.5 |

FOREIGN PATENT DOCUMENTS

| | | | | |
|---|---|---|---|---|
| CA | 645595 | * | 7/1962 | 180/68.5 |
| DE | 824443 | * | 12/1951 | 180/68.5 |
| DE | 2315390 | * | 10/1973 | 180/68.5 |
| FR | 617974 | * | 3/1927 | 180/68.5 |
| GB | 306895 | * | 11/1929 | 180/68.5 |
| GB | 2015951 | * | 9/1979 | 180/68.5 |
| JP | 63-106157 | * | 5/1988 | 180/68.5 |
| JP | 40-5-185535 | * | 7/1993 | 180/68.5 |
| JP | 10-74499 | | 3/1998 | |
| JP | 10-129276 | | 5/1998 | |

* cited by examiner

*Primary Examiner*—Frank Bennett Vanaman
(74) *Attorney, Agent, or Firm*—Flynn, Thiel, Boutell & Tanis, P.C.

(57) ABSTRACT

A battery fixing structure of vehicle which prevents movement of the battery by fixing the battery in the middle of a battery tray with a fixing member. The fixing structure includes a U-shaped bolt which engages with a bead section formed on the battery tray, and both ends of the fixing member and a portion of the fixing member between the batteries are fixed to the battery tray. A portion of the U-shaped bolt engaging with the bead section is disposed within a groove of the bead section.

14 Claims, 15 Drawing Sheets

LEFT-RIGHT DIRECTION
OF THE VEHICLE

BATTERY FIXING STRUCTURE OF A VEHICLE

FIELD OF THE INVENTION

This invention relates to a battery fixing (securing) structure of a vehicle for fixing a plurality of batteries on the vehicle.

BACKGROUND OF THE INVENTION

Recently, environment-conscious electric vehicles and hybrid vehicles have been developed. Such vehicles generally include a power unit connected with a motor along with a transmission, and a plurality of battery units for storing electric power for travel. The motor is driven by the power generated from the battery units to reduce exhaust, which improves the environment.

Referring to FIGS. 22–24, when disposing a battery unit 202 in a vehicle, a plurality (e.g., three) of batteries (a first battery 204-1, a second battery 204-2, and a third battery 204-3) are positioned on a battery tray 206.

Since the batteries 204-1, 204-2, 204-3 have different heights (a first height H1, a second height H2, and a third height H3), the batteries 204 are provided with a cushion material 208 which is a buffer material extending over upper parts of the batteries 204-1, 204-2, 204-3, and a band 210 which is a fixing member is disposed over the cushion material 208.

Both ends of the band 210 are then fixed to tray flanges 214-1, 214-2 of the battery tray 206 with clamping bolts 212-1, 212-2 so that the batteries 204-1, 204-2, 204-3 are clamped and fixed by the band 210.

The different heights of the batteries 204-1, 204-2, 204-3 are then complemented by the bent cushion material 208.

Such vehicles with a plurality of batteries are disclosed in Japanese Patent Laid-Open No. 1998-129276 and Japanese Patent Laid-Open No. 1998-74499. A vehicle with a plurality of batteries disclosed in Japanese Patent Laid-Open No. 1998-129276 includes: a pressing member for pressing the upper part of a battery; a combination stopper fixed to a battery tray in the direction perpendicular to the pressing member; a relay member to combine the combination stopper with the pressing member; and upper and side restricting board portions in the pressing member each opposed to upper and side surfaces so that each battery is arranged closer together in a row with shorter intervals between batteries. A vehicle with a plurality of batteries disclosed in Japanese Patent Laid-Open No. 1998-74499 has a form-variable member which can transform and adhere to the top surfaces of each battery on the battery tray, the form-variable member being attached to a mounting surface for installing a battery tray, thereby enabling a simpler structure for easier manufacture.

Referring to FIGS. 22–24, a conventional vehicle with a plurality of batteries (a first battery 204-1, a second battery 204-2, and a third battery 204-3) is designed to overcome varieties of heights H1, H2, H3 of respective batteries 204-1, 204-2, 204-3 by clamping with clamping bolts 212-1, 212-2 while forming spaces S1, S2.

However, when batteries 204-1, 204-2, 204-3 are arranged in such a manner, communication portions 216-1, 216-2 at both ends of the band 210 are transformed or deformed (See FIG. 22) such that a pressing section 218 of the band 210 can not secure the middle of the second battery 204-2.

The clamping bolts 212-1, 212-2 with such a transformed band 210 can not produce the requisite axial-force, thereby loosening the band 210 and clamping bolts 212-1 and 212-2 which allows movement of the second battery 204-2 and further can not secure the whole battery unit.

In order to obviate or at least minimize the above inconveniences, the present invention provides a battery fixing structure of a vehicle having a battery tray mounted therein with a plurality, and in the illustrated embodiment at least three, of batteries disposed on said battery tray, comprising: an upwardly projecting bead section at the bottom of said battery tray between adjacent batteries; a fixing member with an interposed buffer material at the top of said batteries; and a U-shaped bolt engaging with said bead section such that both ends of said fixing member and a portion of said fixing member between said batteries are fixed to said battery tray; wherein a portion of said U-shaped bolt engaging said bead section is disposed within a groove of said bead section.

The present invention provides such a structure wherein the portion of said U-shaped bolt engaging with said bead section is disposed within a groove of said bead section projecting upwardly from the bottom of the battery tray, and said fixing member portion between said batteries is fixed to said battery tray. Accordingly, a shaft portion of the U-shaped bolt engaging with the bead section does not protrude from the battery tray bottom. In addition, loosening of the fixing member does not occur, thereby preventing movement of the middle battery on the battery tray.

DETAILED DESCRIPTION

Figure 4:
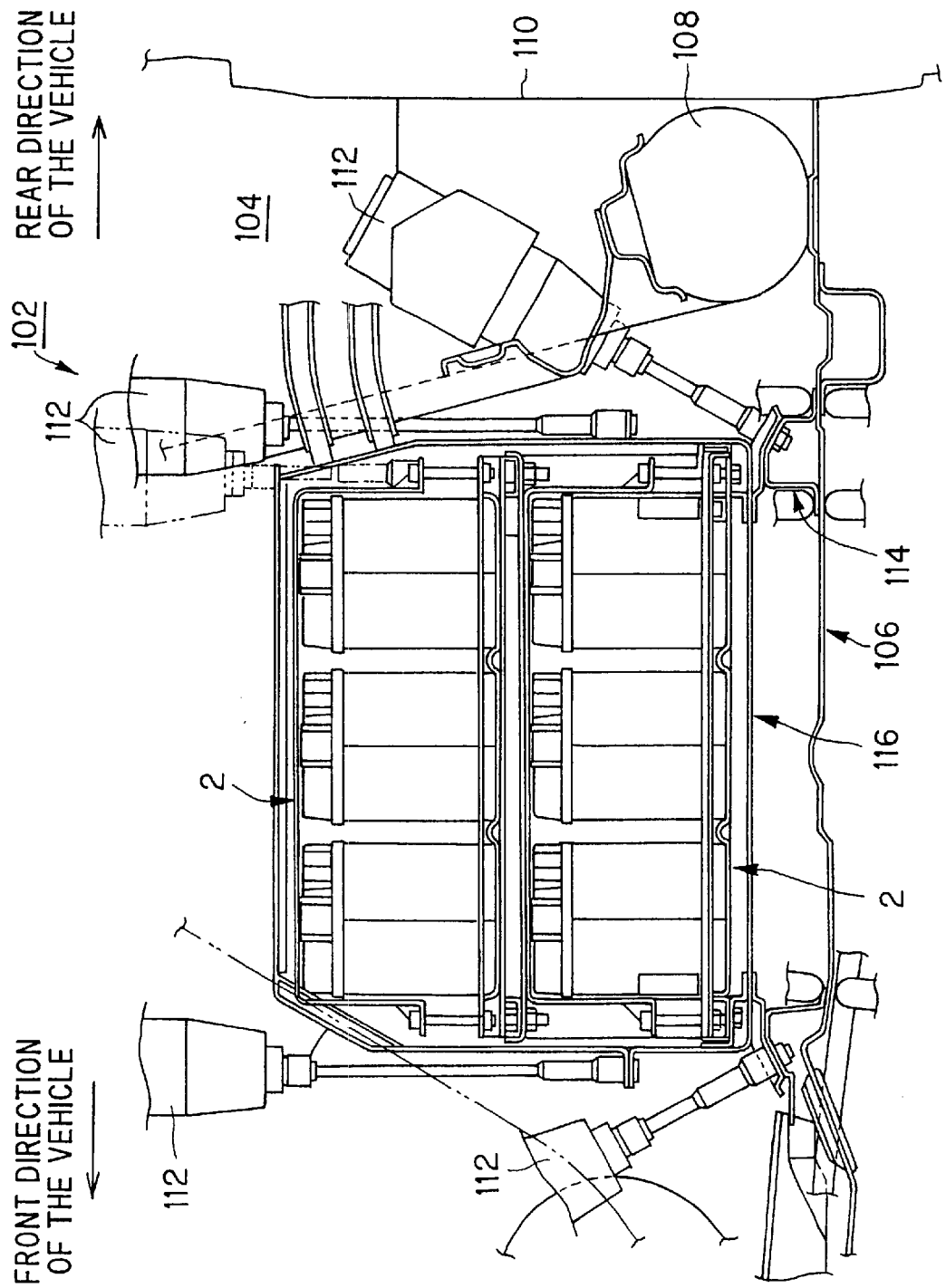
FIG. 4 is a cross-sectional view of a vehicle taken along line IV—IV in FIG. 5.
Figure 5:
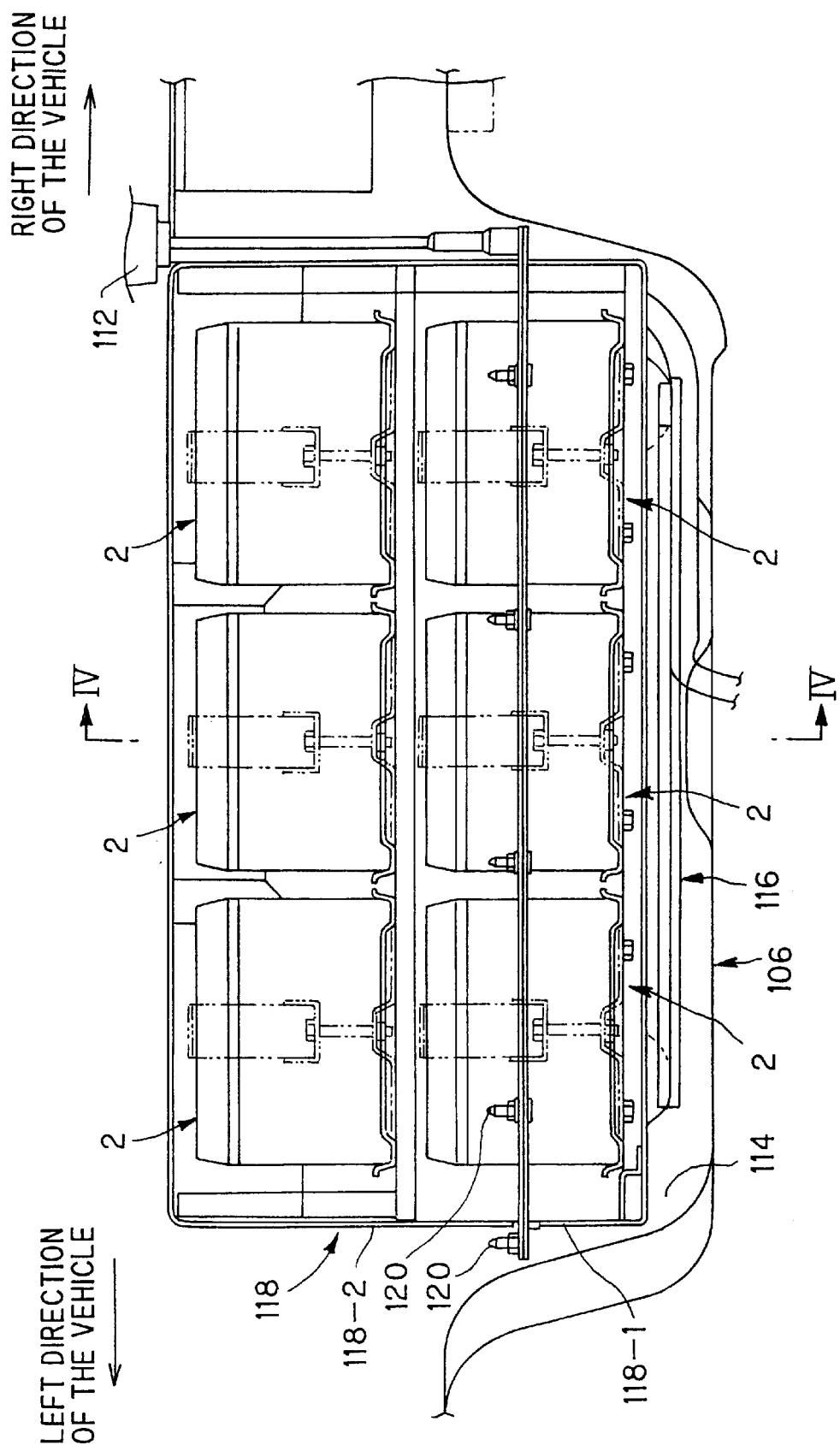
FIG. 5 is a rear view of the vehicle.

The present invention will now be described in specific detail with reference to FIGS. 1–5 which illustrate a first embodiment of the present invention. Referring to FIGS. 4 and 5, a vehicle 102, which may be an electric vehicle or a hybrid vehicle, comprises a trunk 104 in rear of the vehicle 102, an under floor 106 of the trunk 104, a spare tire 108 stored in the trunk 104, a rear panel 110, and an electric screwdriver 112 for installation. A concave portion 114 is formed on the under floor 106 in the middle of the trunk 104. A support member 116 which is spaced slightly above and is secured to the under floor 106 adjacent the concave portion 114. A battery covering member 118 is fixed on the support member 116. The battery covering member 118 includes: a lower battery covering section 118-1 directly fixed on the support member 116, and an upper battery covering section 118-2 fixed on the lower battery covering section 118-1 by a plurality of bolts 120. The battery covering member 118 has a plurality of battery units 2 (See FIGS. 1–3) therein. Each battery unit 2 includes a plurality, and in the illustrated embodiment at least three, of batteries 6 on a battery tray 4.

The vehicle 102 includes, for example, more than one battery unit 2, and in the illustrated embodiment three units 2 are arranged in side-by-side relation with one another in a transverse direction of the vehicle 2, and an additional three units 2 are positioned above the respective lower units 2. That is, six battery units 2 in all are located in the battery covering member 118 mounted on the vehicle 102.

Figure 1:
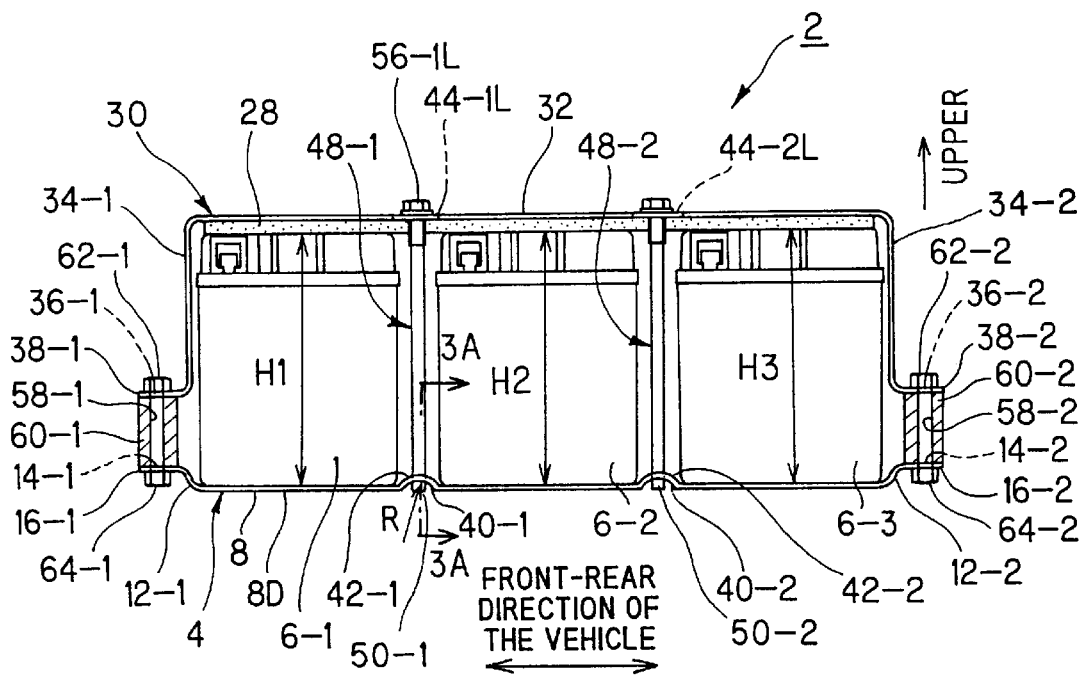
FIG. 1 is a cross-sectional view of the battery unit taken along line I—I in FIG. 2.
Figure 2:
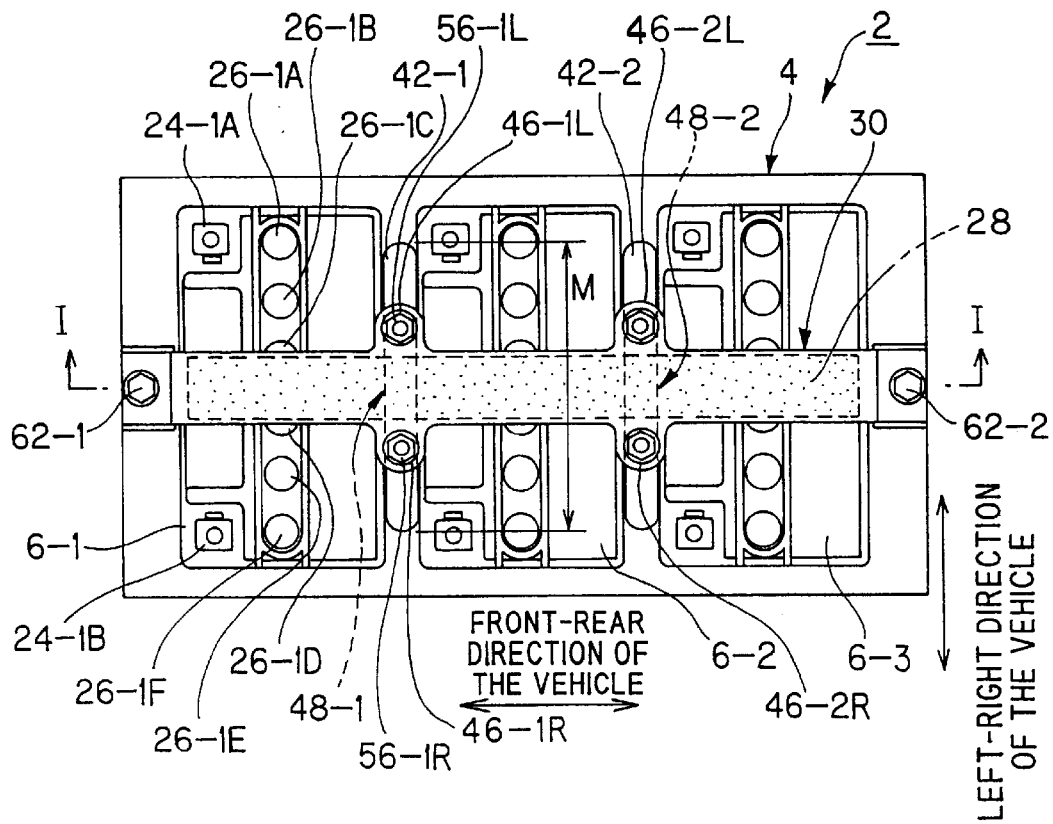
FIG. 2 is a plan view of the battery unit of the first embodiment.
Figure 3:
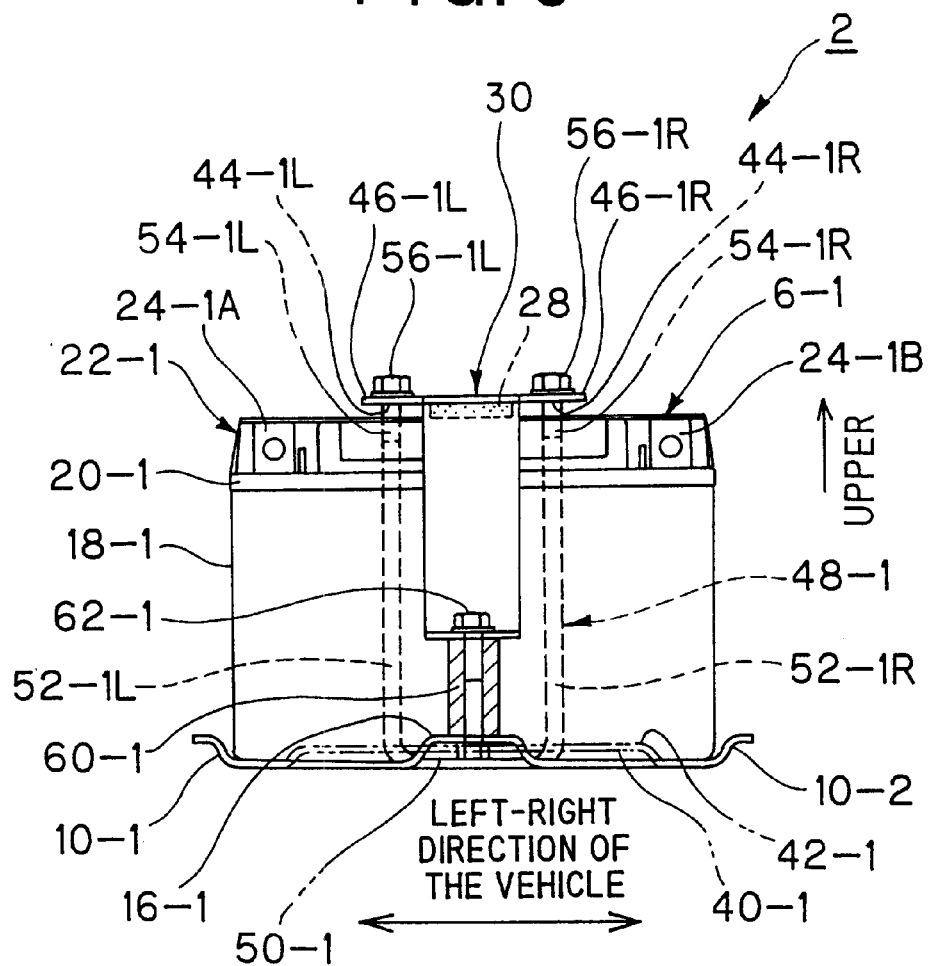
FIG. 3 is a left side elevational view showing the battery unit of FIG. 2.

As shown in FIGS. 1–3, the battery unit 2 has a plurality, e.g. three, of batteries (a first battery 6-1, a second battery 6-2, and a third battery 6-3) disposed in a row at certain intervals on the substantially rectangular battery tray 4. The batteries 6-1, 6-2, 6-3 have respective different heights H1, H2, H3. At the bottom 8 of the battery tray 4, longitudinal-side battery supporting step portions 10-1, 10-2 extend longitudinally in a front-rear direction on both sides of the vehicle, and transverse-side battery supporting step portions 12-1, 12-2 extend transversely in a left-right direction on both sides of the vehicle.

A first tray flange 16-1 is provided in connection with the transverse-side battery supporting step portion 12-1 and defines therein a tray bolt hole 14-1 at a middle portion of step portion 12-1. An opposite tray flange 16-2 is provided in connection with the substantially middle portion of the transverse-side battery supporting step portion 12-2 and defines therein a tray bolt hole 14-2 at a middle portion of step portion 12-2.

The first battery 6-1 comprises a first battery case 18-1 for containing electrolyte, and a first cover 22-1 with a first cover flange 20-1. The first cover 22-1 includes a positive terminal 24-1A, a negative terminal 24-1B, and a plurality of liquid stoppers 26-1A through 26-1F. Incidentally, explanation of the batteries 6-2, 6-3 is omitted since they are the same as or similar to the first battery 6-1.

An elastic belt-shaped cushion material 28, or a buffer material, extends over the upper parts of the batteries 6-1, 6-2, 6-3 in a longitudinal orientation generally centrally along the battery unit 2. A belt-shaped band 30 as a fixing member is disposed at a top surface of the cushion material 28 and extends therealong. The cushion material 28 functions to fill in clearances (spaces) between the band 30 and upper parts of the batteries 6-1, 6-2, 6-3. The band 30 includes: a pressing section 32 corresponding to the cushion material 28; a first communicating portion or leg 34-1 in connection with one side of the pressing section 32 and projecting downwardly; a first band flange 38-1 in connection with the first communicating portion 34-1 corresponding to the first tray flange 16-1, the band flange 38-1 including a band bolt hole 36-1; an opposite communicating portion or leg 34-2 in connection with other side of the pressing section 32 and projecting downwardly; an opposite band flange 38-2 in connection with the opposite communicating portion 34-2 corresponding to the opposite tray flange 16-2, the band flange 38-1 including a band bolt hole 36-2.

The battery tray 4 has at the bottom 8 thereof a first bead section 42-1 projecting upwardly and defining a first groove 40-1 which opens downwardly. The first groove 40-1 is formed between the batteries 6-1 and 6-2 in a transverse direction of the vehicle 102. First groove 40-1 has a predetermined length M and is curved with a radius "R" upwardly from the bottom surface 8D of the bottom 8. The first bead section 42-1 functions to prevent contact between the bottoms of batteries 6-1, 6-2, and also increases the strength of the bottom 8. Similarly, the battery tray 4 has at the bottom 8 thereof a second bead section 42-2 projecting upwardly and defining a second groove 40-2. The second groove 40-2 is formed between the batteries 6-2 and 6-3 in a transverse direction, has a predetermined length M, and is curved with a radius "R" upwardly from the bottom surface 8D of the bottom 8. The second bead section 42-2 functions to prevent contact between the bottoms of batteries 6-2, and also thereby increases the strength of bottom 8.

The band 30 includes a first flange 46-1L and a first opposite flange 46-1R between the batteries 6-1, 6-2 which flanges 46-1L and 46-1R extend in a transverse direction. The flanges 46-1L, 46-1R correspond in location to the first groove 40-1 and have bolt holes 44-1L, 44-1R, respectively. The band 30 also includes a second flange 46-2L and a second opposite flange 46-2R between the batteries 6-2, 6-3 which flanges 46-2L and 46-2R extend in a transverse direction. The flanges 46-2L, 46-2R correspond to the second groove 40-2 and have bolt holes 44-2L, 44-2R, respectively.

Furthermore, a first U-shaped bolt 48-1 is positioned between the batteries 6-1, 6-2 from below. The first U-shaped bolt 48-1 which is a stud bolt includes: a first engaging portion 50-1 which is a shaft portion engaging with or disposed within the first groove 40-1 of the first bead section 42-1; and upright first shanks 52-1L, 52-1R connected to respective opposite ends of the first engaging portion 50-1. First thread portions 54-1L, 54-1R at ends of the first support portions 52-1L, 52-1R are screwed from below into first bolt holes 44-1L, 44-1R of the first flanges 46-1L, 46-1R of the band 30 and are secured thereto by first nuts 56-1L, 56-1R. In this case, the first engaging portion 50-1, which is a shaft portion of the first U-shaped bolt 44-1, is engaged with the first bead section 42-1 in the first groove 40-1. That is, portion 50-1 is contained within the first groove 40-1 without projecting from the bottom surface 8D of the bottom 8 of the battery tray 4.

Figure 3A:
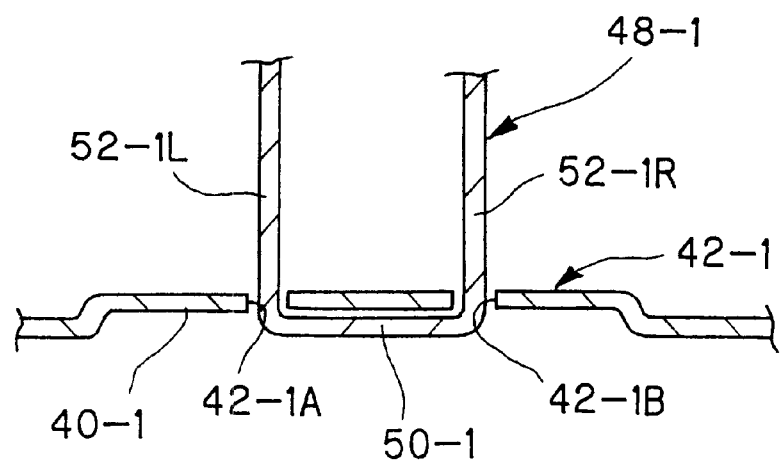
FIG. 3A is an enlarged, fragmentary cross-sectional view taken along line 3A—3A in FIG. 1.

In one embodiment, each bead section 42-1 includes a pair of transversely-spaced openings 42-1A, 42-1B (FIG. 3A) therein and the respective shanks 52-1L and 52-1R project upwardly through these openings 42-1A, 42-1B for connection to band 30.

Similarly a second U-shaped bolt 48-2 is also positioned between the batteries 6-2, 6-3 from below. The second U-shaped bolt 48-2 is formed and attached in the same manner as the first U-shaped bolt 48-1.

The tray flange 16-1 and the band flange 38-1 are connected by a clamping bolt 62-1 and a clamping nut 64-1 through a spacer 60-1 having a predetermined length and defining a bolt hole 58-1. Similarly, the opposite tray flange 16-2 and the opposite band flange 38-2 are connected by a clamping bolt 62-2 and a clamping nut 64-2 through a spacer 60-2 having a predetermined length and defining a bolt hole 58-2. The spacers 60-1, 60-2, when clamping with the clamping bolts 62-1, 62-2 and clamping nuts 64-1, 64-2 to pinch the batteries 6-1, 6-2, 6-3 with the battery tray 8 from below and the band 30 from above, thereby produce an axial force which improves the rigidity of the whole system.

The operation of the above embodiment will now be described.

In the battery unit 2, the first and second engaging portions 50-1, 50-2 of the first and second U-shaped bolts 48-1, 48-2 are positioned within the respective grooves 40-1, 40-2 defined in the bottom 8 of the battery tray 4.

The portions 50-1, 50-2 are then fixed to the battery tray 4 at the position between the batteries 6-1, 6-2 adjacent to the band 30 as a fixing member, and between the adjacent batteries 6-2, 6-3.

Accordingly, the first and second engaging portions 50-1, 50-2 which are shaft portions of the first and second U-shaped bolts 48-1, 48-2 do not protrude from the bottom surface 8D of the bottom 8 of the battery tray 4 and, without loosening the band 30, apply pressure to fix the second battery 6-2 in middle of the battery tray 4 with the band 30, and as a result, the whole battery unit is fixed as well.

In addition, the first spacer 60-1 having a predetermined length is located between the first tray flange 16-1 and the first band flange 38-1, and the opposite spacer 60-2 having a predetermined length is located between the opposite tray flange 16-2 and the opposite band flange 38-2, which avoids transformation or deformation of the band 30 and effectively prevents loosening of the band 30 and the clamping bolts 62-1, 62-2 through an axial-force.

Moreover, the batteries 6-1, 6-2, 6-3 are further firmly fixed when the lengths of the spacers 60-1, 60-2 are set to correspond to those of the batteries 6-1, 6-2, 6-3.

In this first embodiment, the cushion material 28 below the band 30 as a fixing member is pressed against the top of the batteries 6 by the U-shaped bolt 48 between the adjacent batteries 6. Accordingly, instead of utilizing spacers 60-1, 60-2, the communicating portion 34-1, 34-2 of the band 30 can be extended downwardly and the ends of the communicating portions 34-1, 34-2 can be connected directly to the tray flanges 16-1, 16-2 of the battery tray 4 by the clamping bolts 62-1, 62-2 and the clamping nuts 64-1, 64-2, thereby reducing the number of parts, the number of processing steps, and costs.

Figure 6:
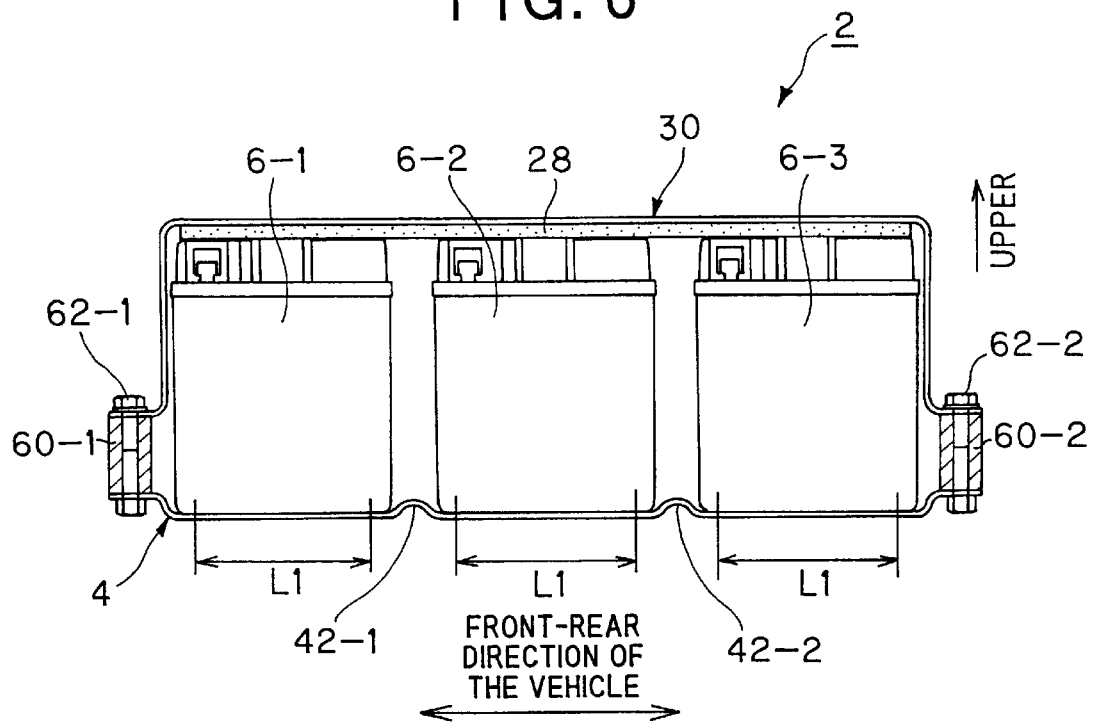
FIG. 6 is a cross-sectional view of a battery unit of the second embodiment taken along line VI-VI in FIG. 7.
Figure 7:
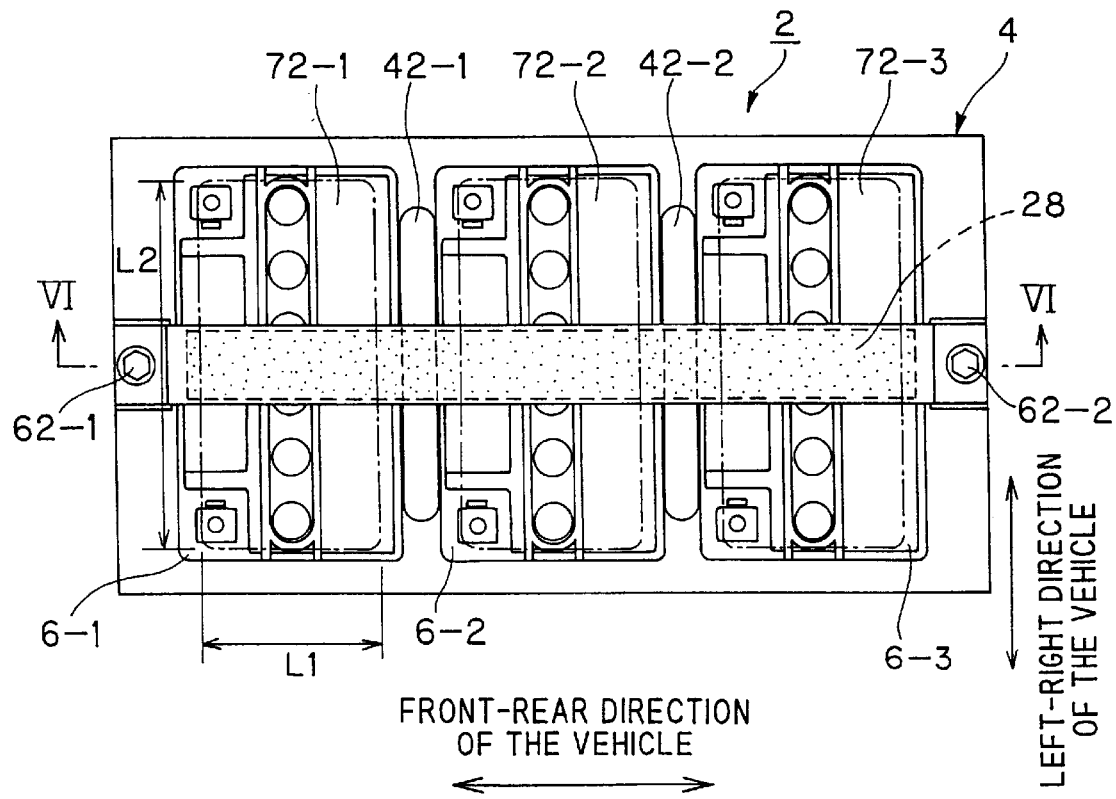
FIG. 7 is a plan view of the battery unit of the second embodiment.
Figure 8:
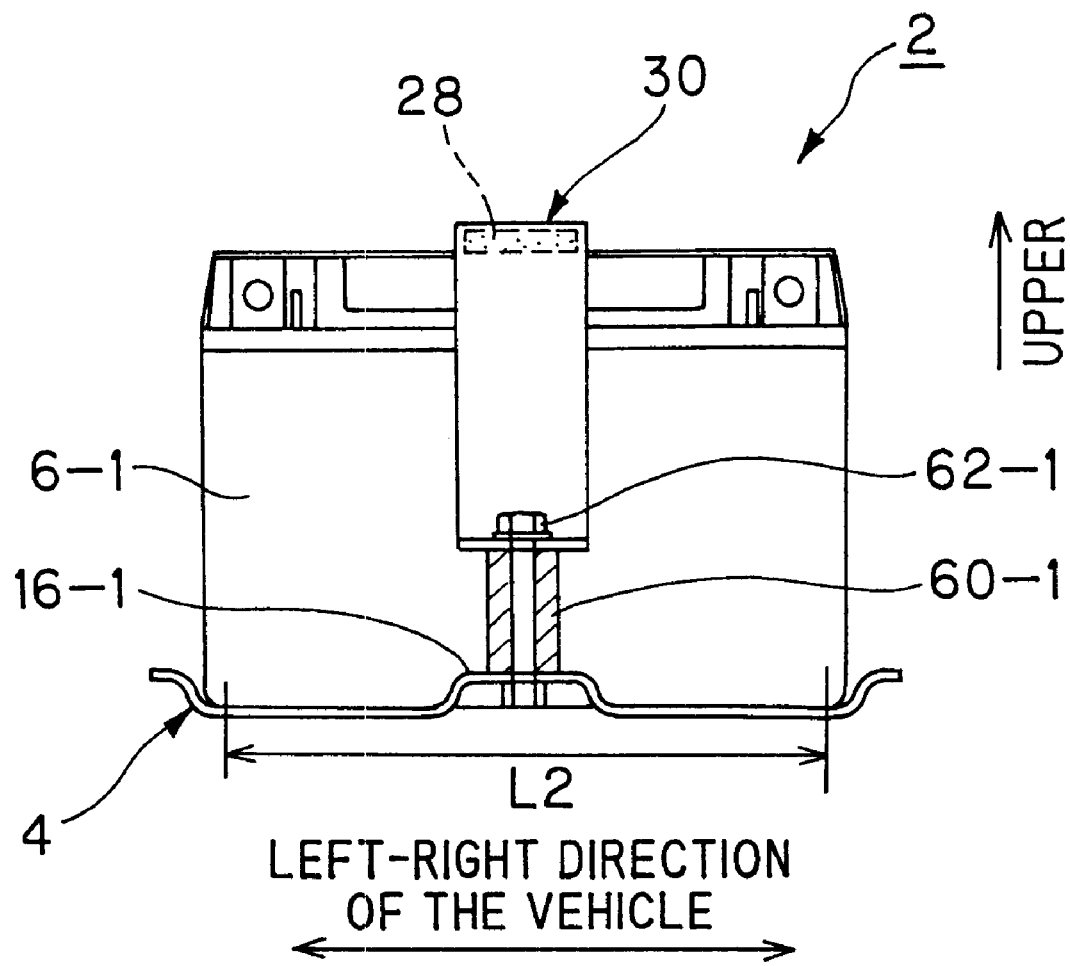
FIG. 8 is a left side elevational view of the battery unit of FIG. 7.

FIGS. 6–8 illustrate a second embodiment of the present invention.

The same reference characters are hereinafter utilized for features identical or similar in function to those described in the first embodiment.

The second embodiment is characterized in that both ends of a band 30 which is a fixing member are fixed to a battery tray 4 and bottoms of each battery 6-1, 6-2, 6-3 are fixed to the battery tray 4 through fastening members 72-1, 72-2, 72-3 (as shown in broken lines in FIG. 7). The fastening members 72-1, 72-2, 72-3 include a double-sided adhesive tape and are formed to have a length L1 in a longitudinal (front-rear) direction of the vehicle (See FIG. 6) and a length L2 in a transverse (left-right) direction (See FIG. 8).

According to the structure of the second embodiment, bottoms of the batteries 6-1, 6-2, 6-3 are fixed to the bottom 8 of the battery tray 4, therefore, the batteries 6-1, 6-2, 6-3 can be fixed regardless of the different heights thereof, and the cushion material can be omitted as a buffer, if desirable or necessary, so as to reduce the number of parts and processing steps.

It is noted in this the second embodiment that the batteries 6-1, 6-2, 6-3 are fixed only at the bottommost, so that adhesion with only double-sided adhesive tape as a fastening member 72 may not be sufficient to prevent leaning or falling of heavy batteries 6-1, 6-2, 6-3. In this situation, the batteries 6-1, 6-2, 6-3 can be securely fixed by fixing the upper parts of each battery 6-1, 6-2, 6-3 by the band 30 as in the first embodiment. In addition, the clearance gap between the band 30 and the batteries 6-1, 6-2, 6-3 is preferably set such that the double-sided adhesive tape as a fastening member 72 does not peel.

Figure 9:
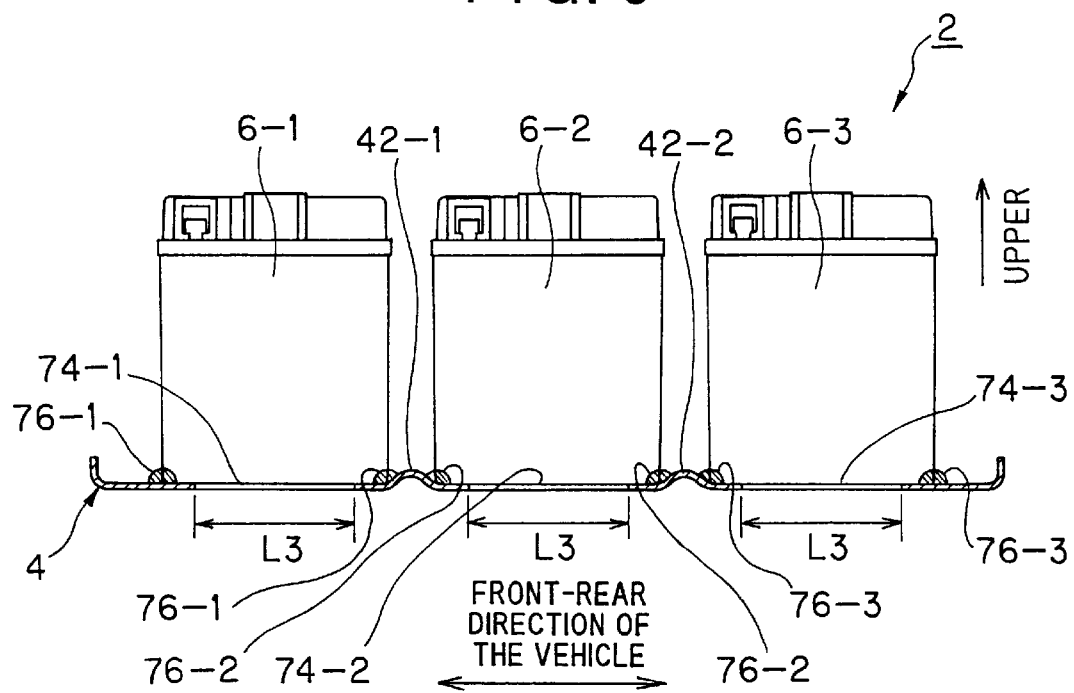
FIG. 9 is a cross-sectional view of a battery unit of the third embodiment taken along line IX—IX in FIG. 10.
Figure 10:
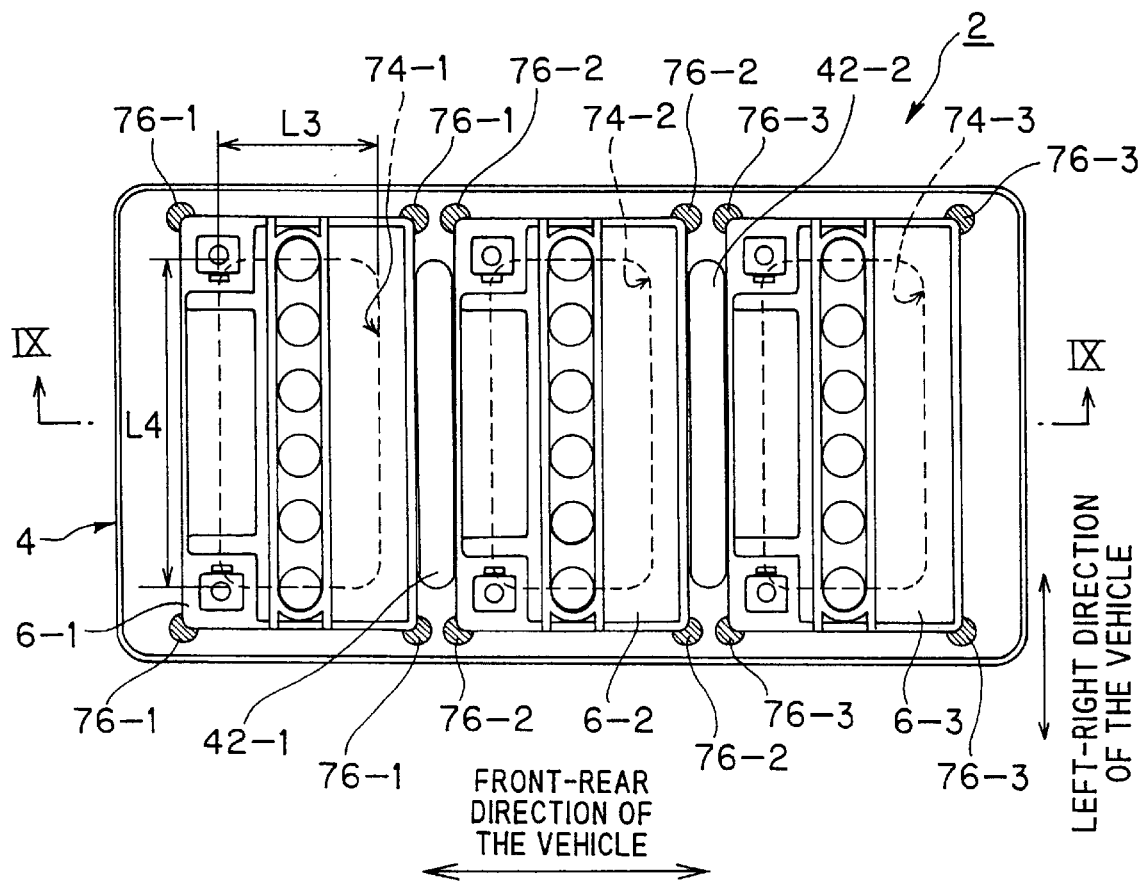
FIG. 10 is a plan view of the battery unit of the third embodiment.
Figure 11:
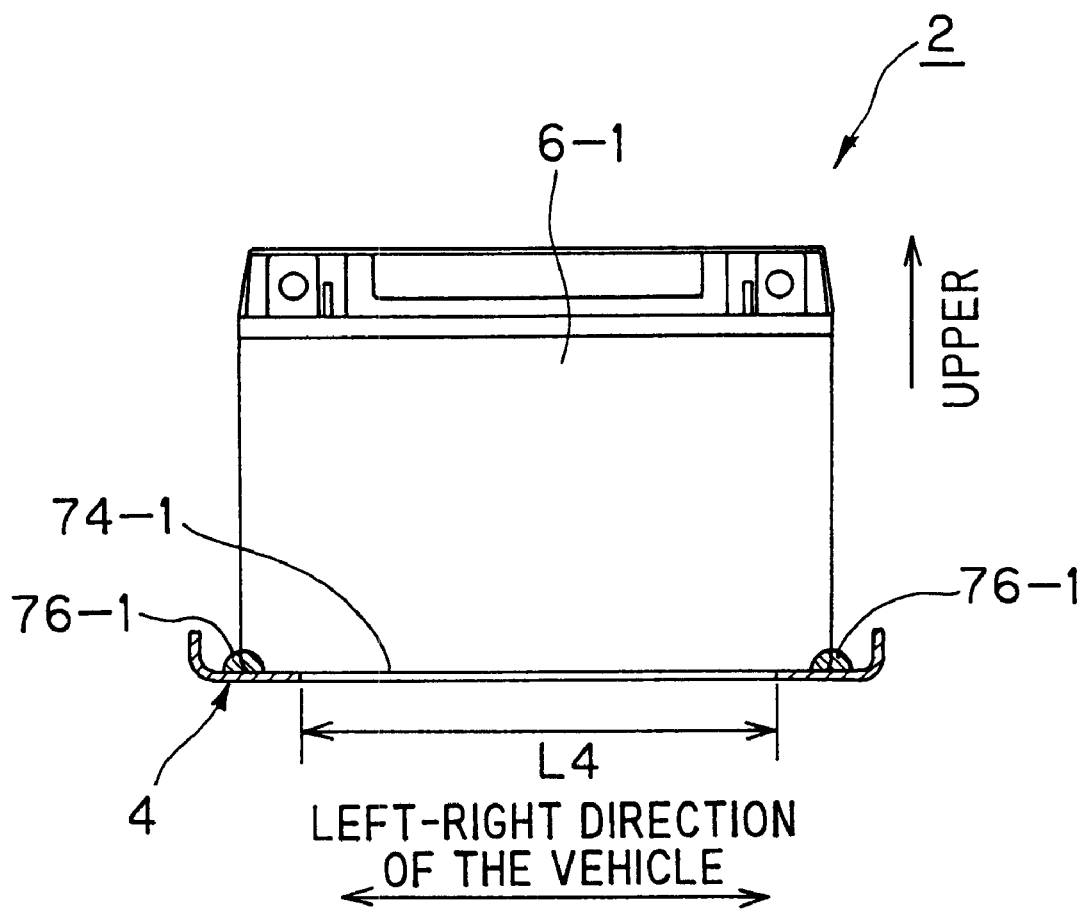
FIG. 11 is a left side elevational view of the battery unit of FIG. 10 shown partially in cross-section.

FIGS. 9–11 illustrate a third embodiment of the present invention.

The third embodiment is characterized in that the battery tray 4 is formed so as to have a saucer shape, and at the bottom 8 thereof air vent portions 74-1, 74-2, 74-3 are formed for cooling the batteries 6-1, 6-2, 6-3. The air vent portions 74-1, 74-2, 74-3 are formed to have a length L3 in a longitudinal (front-rear) direction of the vehicle and a length L4 in a transverse (left-right) direction. The bottom corners of each battery 6-1, 6-2, 6-3 are fixed to the bottom 8 by adhesive 76-1, 76-2, 76-3.

According to the structure of the third embodiment, heat from the batteries 6-1, 6-2, 6-3 can be discharged outside to cool the batteries 6-1, 6-2, 6-3. In addition, the corners of the lower parts of each battery 6-1, 6-2, 6-3 are fixed at the bottom 8 of the tray by the adhesive, so that a fixing band or clamping bolts can be eliminated to reduce the number of parts, and the battery tray 8 can be formed to have a simple shape.

Figure 12:
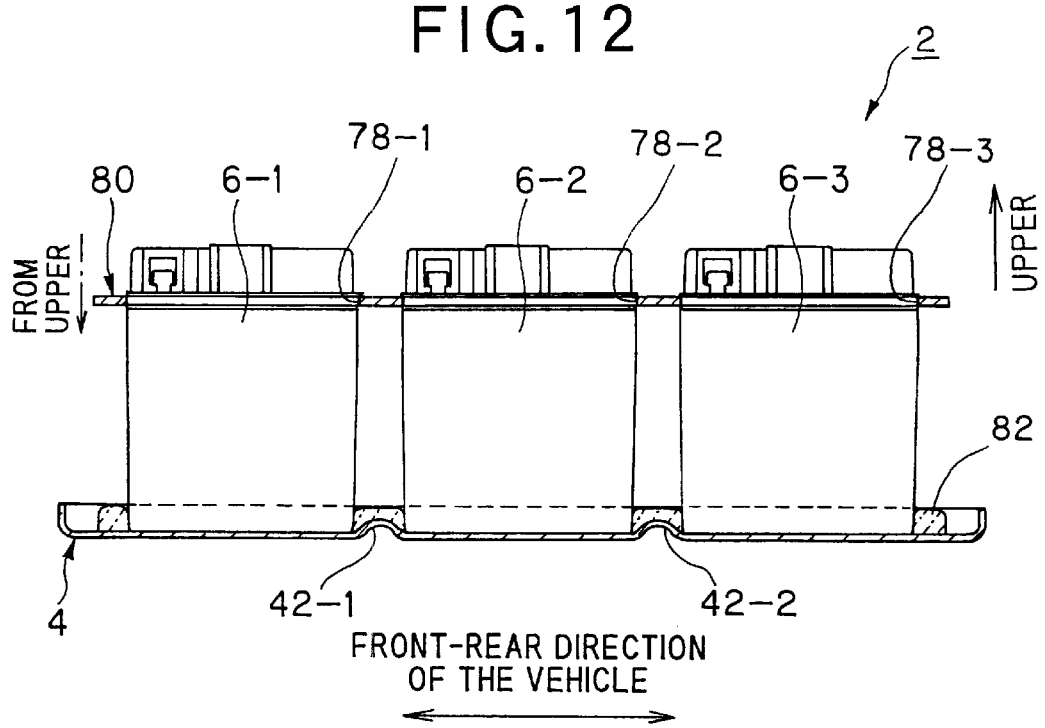
FIG. 12 is a cross-sectional view of a battery unit of the fourth embodiment taken along line XII—XII in FIG. 13.
Figure 13:
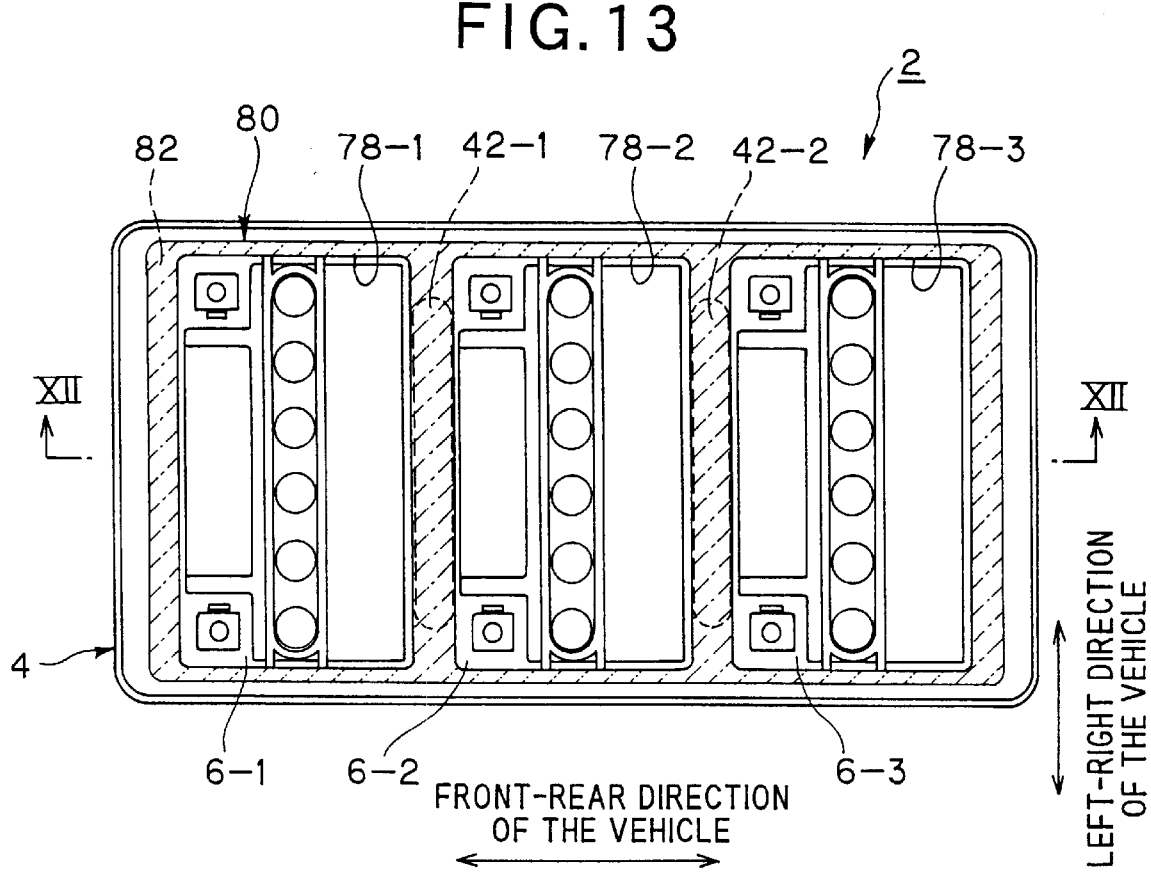
FIG. 13 is a plan view of the battery unit of the fourth embodiment.
Figure 14:
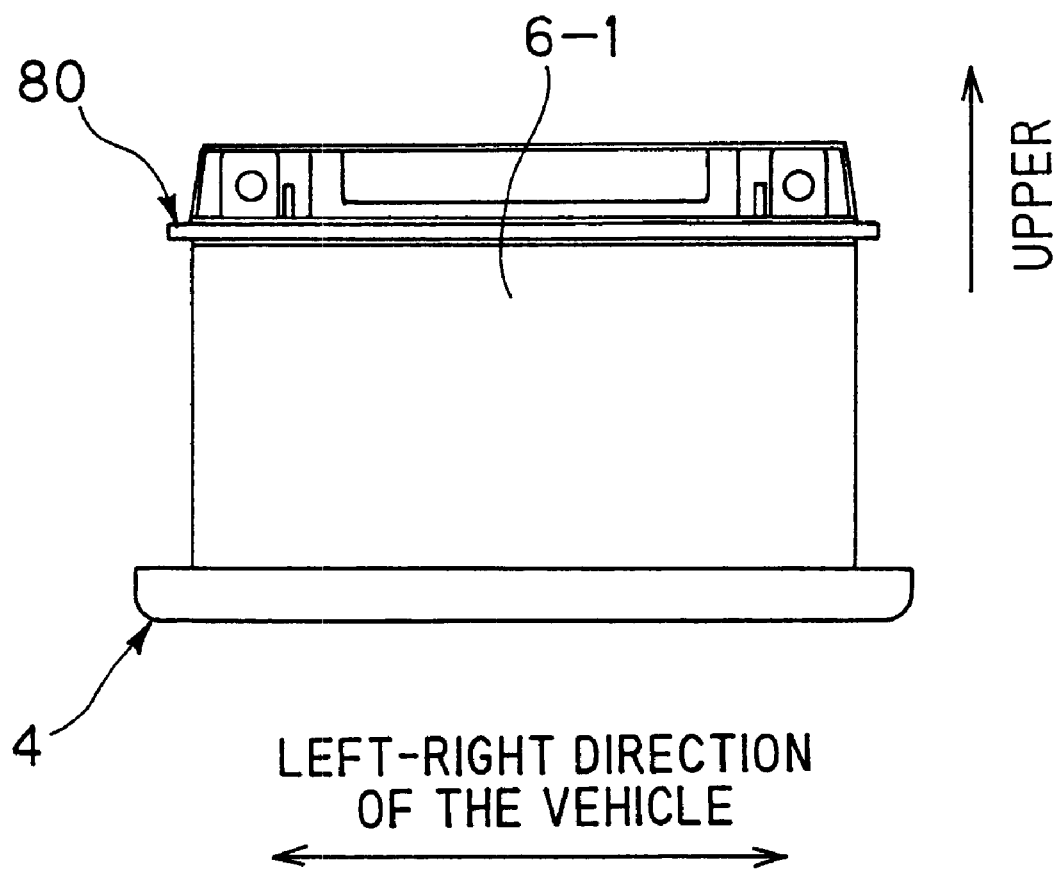
FIG. 14 is a left side elevational view of the battery unit of FIG. 13.

FIGS. 12–14 illustrate a fourth embodiment of the present invention.

The fourth embodiment is characterized in that the battery tray 4 is formed so as to have a saucer shape, and a holding plate 80 including holding holes 78-1, 78-2, 78-3 which receive the batteries 6-1, 6-2, 6-3 is fixed to the upper part of each battery 6-1, 6-2, 6-3 so that movement of the batteries 6-1, 6-2, 6-3 is prevented. Thus, the holding plate 80 serves to fix the upper parts of the batteries 6-1, 6-2, 6-3, which may be particularly heavy, to prevent the batteries 6-1, 6-2, 6-3 from leaning or falling. The holding holes 78-1, 78-2, 78-3 of the holding plate 80 are fitted around cover flanges 20-1, 20-2, 20-3 having, for example, maximum diameters to allow installation of the batteries 6-1, 6-2, 6-3 from above, and adhesive is applied to the holes 78 to fix the batteries within the holes of plate 80. In the saucer shaped battery tray 4, whole lower peripheral parts of each battery 6-1, 6-2, 6-3 are fixed by a resin mold 82.

According to the structure of the fourth embodiment, the holding plate 80 having the holding holes 78-1, 78-2, 78-3 defined therein in which the batteries 6-1, 6-2, 6-3 are fixed, securely fixes the upper parts of the batteries 6-1, 6-2, 6-3 thereby preventing falling or toppling of the batteries 6-1, 6-2, 6-3 caused by an external force. In addition, the whole peripheral lower parts of the respective batteries 6-1, 6-2, 6-3 are fixed to the bottom 8 of the tray by the mold 82, which can avoid the need for a fixing band or clamping bolts thereby reducing the number of parts, and allowing forming of the battery tray 8 in a simple shape.

Figure 15:
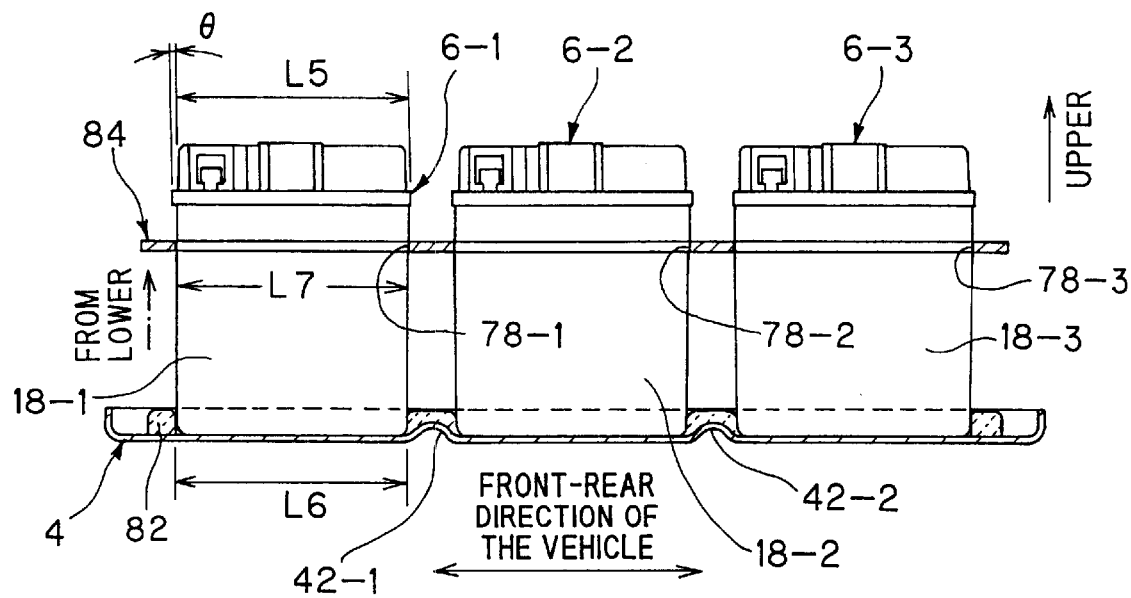
FIG. 15 is a cross-sectional view of the battery unit of the fifth embodiment.
Figure 16:
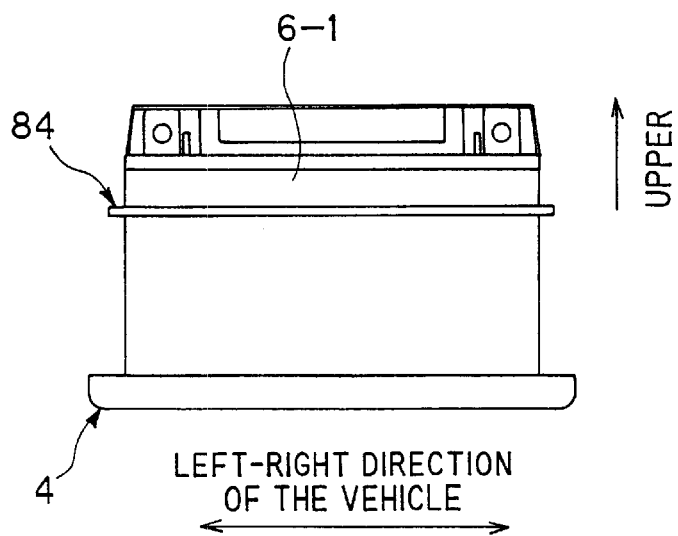
FIG. 16 is a left side elevational view of the battery unit of FIG. 15.

FIGS. 15 and 16 illustrate a fifth embodiment of the present invention.

The fifth embodiment is characterized in that the holding plate 84 is attached against the battery cases 18 which have a trapezoid shape. That is, the battery cases 18 are formed to have a draft (θ) during manufacturing such that the lower ends have a dimension L6 and the upper ends have a dimension L5 which is greater than dimension L6. The holding plate 84 includes the holding holes 78-1, 78-2, 78-3 each of which has a dimension L7 which is greater than dimension L6 but less than dimension L5. Before applying the mold 82 to the battery cases 18, the battery tray 4 is provided with the holding plate 84.

The mold 82 is then applied after the batteries 6-1, 6-2, 6-3 are mounted into the respective holes of plate 84 from above. Before the molding process, the holding plate 84 is lifted up and is fixed to the battery cases 18 by wedging.

According to the structure of the fifth embodiment, the holding plate 84 is fitted to be fixed to the battery case 18 which has a trapezoid shape which opens upwardly (or has the larger dimension at the top than at the bottom), which can fix the holding plate 84 with a simple structure.

Figure 17:
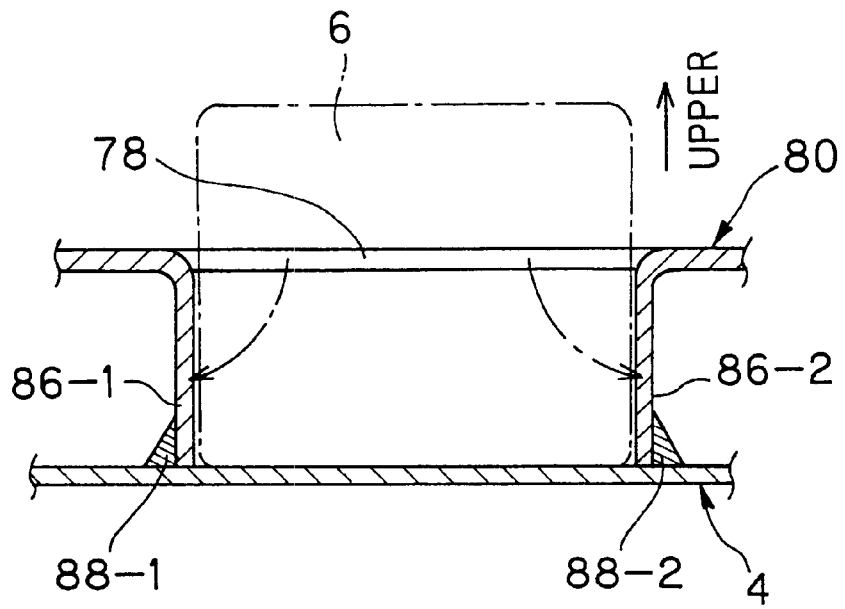
FIG. 17 is a schematic cross-sectional view showing the battery unit of the sixth embodiment.

FIG. 17 shows a specific constitution of the present invention as a sixth embodiment of the invention.

The sixth embodiment is characterized in that when the holding hole 78 for positioning battery 6 is formed in the holding plate 80, redundant bent portions 86-1, 86-2 equivalent to the holding hole 78 are bent downwardly, and then lower ends of the bent portions 86-1, 86-2 abut the bottom of the battery tray 4 so that the lower ends are held by projecting holding sections 88-1, 88-2 formed at the bottom of the battery tray 4 so as to project upwardly therefrom for engagement with the respective bent portions 86-1, 86-2.

According to the structure of the sixth embodiment, the formation of the hole 78 in holding plate 80 does not produce unnecessary materials. Further, the lower ends of the bent portions 86-1, 86-2 are held to the bottom of the battery tray 4, which integrates the battery 6 and the battery tray 4 to develop whole system rigidity. The batteries 6 are securely fixed by the bent portions 86-1, 86-2 as well.

Figure 18:
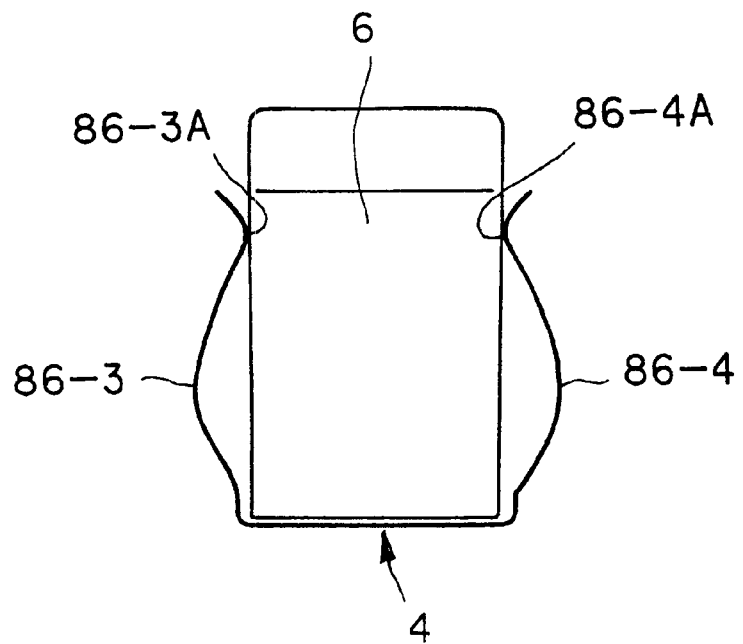
FIG. 18 is a schematic side elevational of the battery which is a modification of the sixth embodiment.

In the sixth embodiment, instead of fixing each adjacent battery 6 or forming the holding plate, the battery 6 itself can be solely fixed as shown in FIG. 18. In other words, respective parts of both sides of the battery tray 4 are bent upwardly to form bent stay portions 86-3, 86-4 having a spring effect at both sides of the battery 6 so that both sides of the upper part of the battery 6 can be pinched and fixed by abutting bent portions 86-3A, 86-4A of the bent stay portions 86-3, 86-4. Thus, the battery 6 can be fixed by employing or utilizing a part of the battery tray 4, which integrates the battery 6 and the battery tray 4 to securely fix the battery 6.

Figure 19:
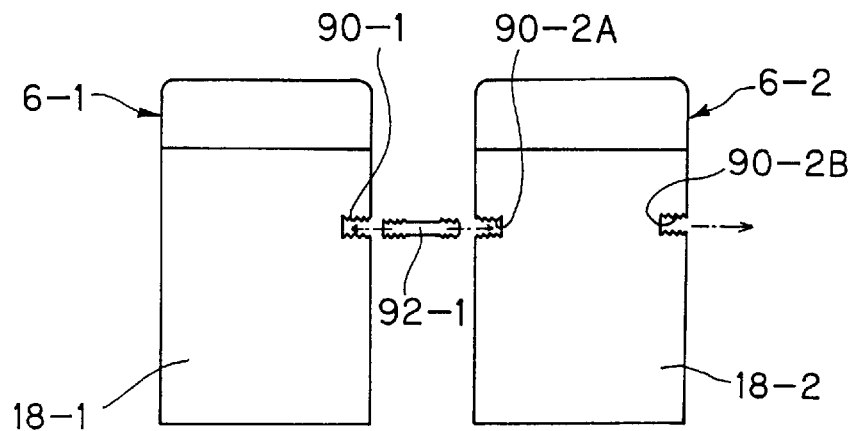
FIG. 19 is a cross-sectional view of the battery unit of the seventh embodiment.

FIG. 19 shows a specific constituent of the present invention as a seventh embodiment of the invention.

The seventh embodiment is characterized in that, between adjacent batteries 6-1, 6-2, a first coupling screw hole 90-1 is formed in the side of the first battery case 18-1 so as to face toward the second battery 6-2, and a second coupling screw hole 90-2A corresponding to the first coupling screw hole 90-1 is formed in the side of the second battery case 18-2 so as to face toward the first battery 6-1. A further second coupling screw hole 90-2B is formed in the side of the second battery case 18-2 so as to face toward a third battery (not shown). The coupling holes 90 are formed in the batteries 6 in the same manner as necessary. Between the adjacent batteries 6-1, 6-2, a first double-end screw bolt 92-1 is threadedly attached into coupling screw holes 90-1, 90-2. The double-end screw bolt 92 is positioned between each pair of adjacent batteries 6 in the same manner.

According to the structure of the seventh embodiment, each battery case 18 of adjacent batteries 6 is fixed by the double-end screw bolt 92, thereby allowing whole batteries 6 to be securely fixed. In addition, the employ of the double-end screw bolt 92 avoids the formation of any protrusions from the battery case 18 of the battery 6, which permits easier handling.

It is noted in the seventh embodiment that the battery 6 must be threaded to connect with the adjacent battery in such a manner that bottom surfaces of the batteries 6 are aligned.

Figure 20:
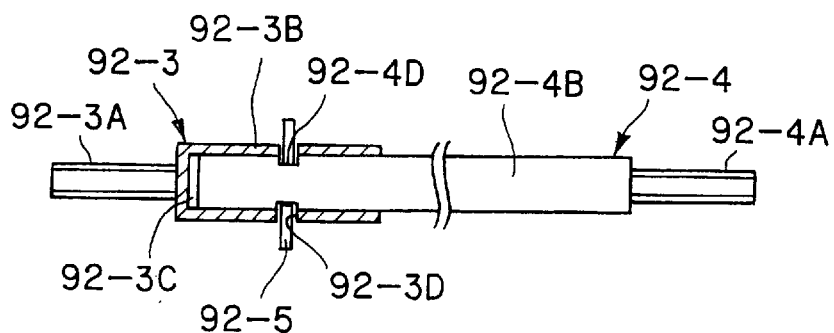
FIG. 20 is a cross-sectional view of a coupling which is a modification of the seventh embodiment.

In addition, since the above structure would require rotation of the battery 6 to couple batteries in sequence, a coupling structure can be provided which includes a first side screw member 92-3 and a second side screw member 92-4 both rotating independently of one another, as shown in FIG. 20. The first side screw member 92-3 includes a screw 92-3A and a hollow hexagonal portion 92-3B.

The hexagon portion 92-3B defines a shaft insert hole 92-3C therein and a circlip hole or holes 92-3D formed in a radial direction at an outer peripheral surface thereof. The second side screw member 92-4 includes a screw 92-4A, and a round shaft portion 92-4B to be inserted into the shaft insert hole 92-3C.

The shaft portion 92-4B includes a circlip engaging groove 92-4D corresponding to the circlip holes 92-3D. Accordingly, for example, after the second side screw member 92-4 is fixed into one battery 6, the first side screw member 92-3 is rotated relative to the second side screw member 92-4, and then the first side screw member 92-3 is fixed to the other battery 6.

A circlip 92-4D is engaged within the circlip holes 92-3D and the circlip engaging groove 92-4D for preventing detachment of the first and second side screw members 92-3, 92-4, which allows an easier connecting procedure for each battery 6.

Figure 21:
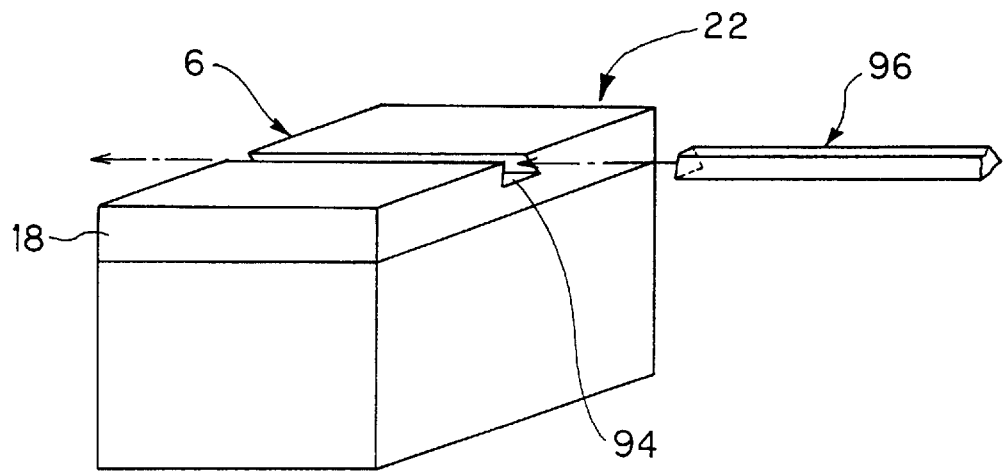
FIG. 21 is a perspective diagram of the battery unit of the eighth embodiment.
Figure 22:
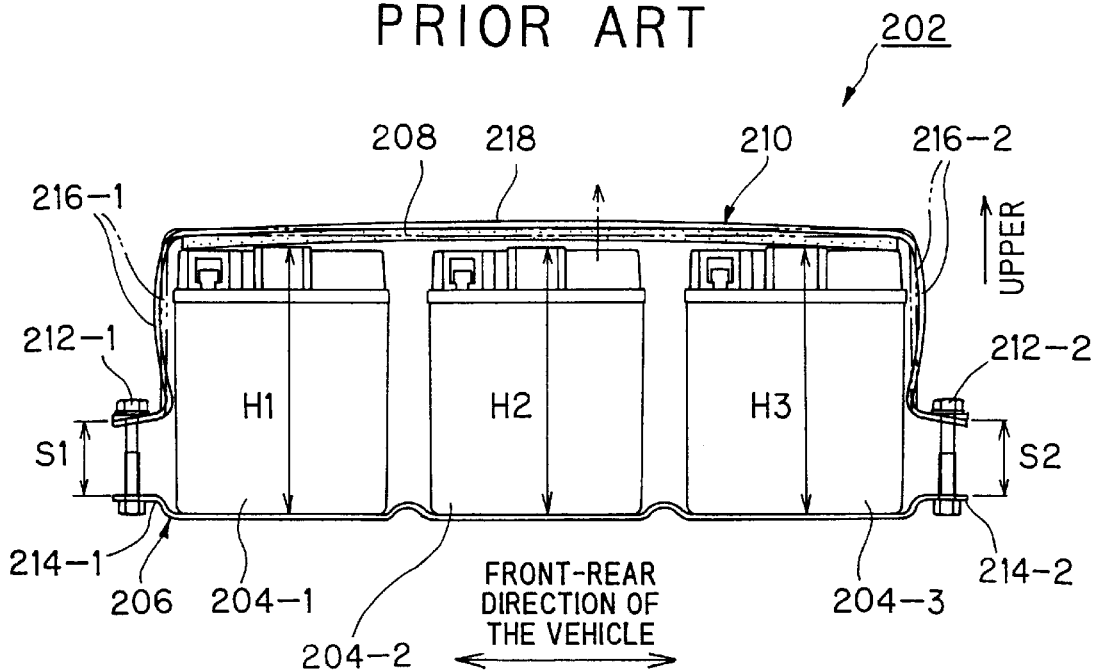
FIG. 22 is a cross-sectional view of a conventional battery unit taken along line XXII—XXII in FIG. 23.
Figure 23:
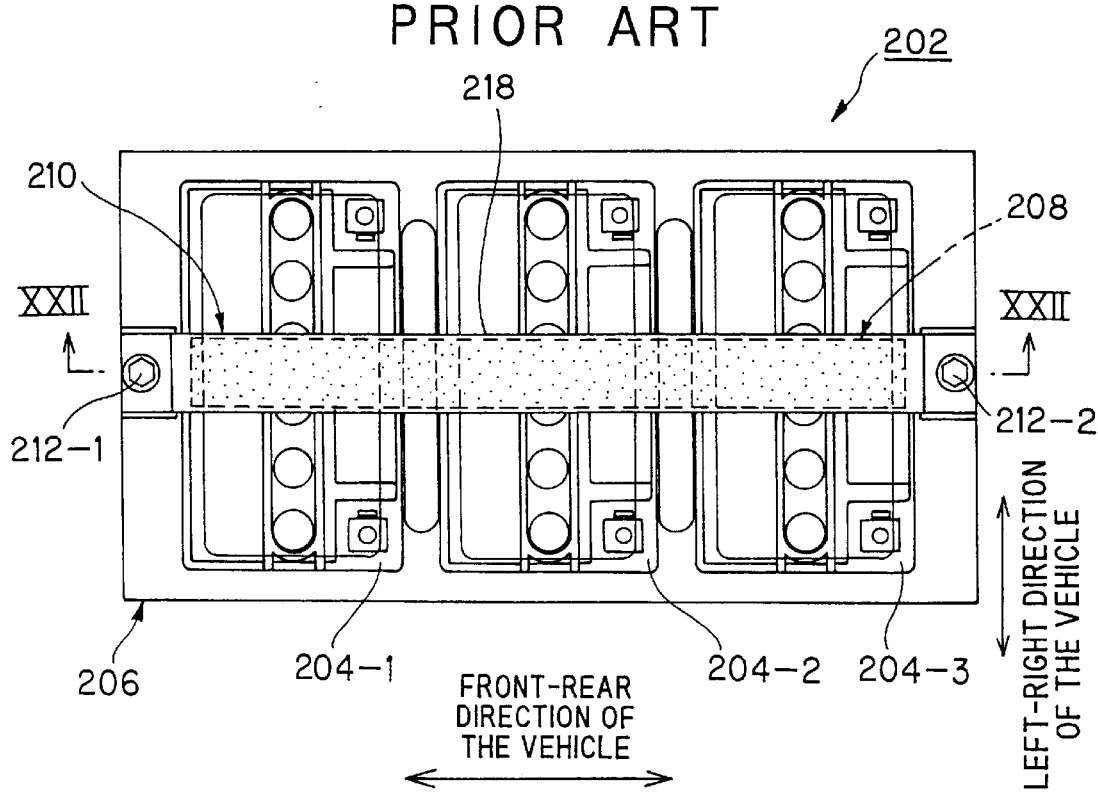
FIG. 23 is a plan view of the conventional battery unit.
Figure 24:
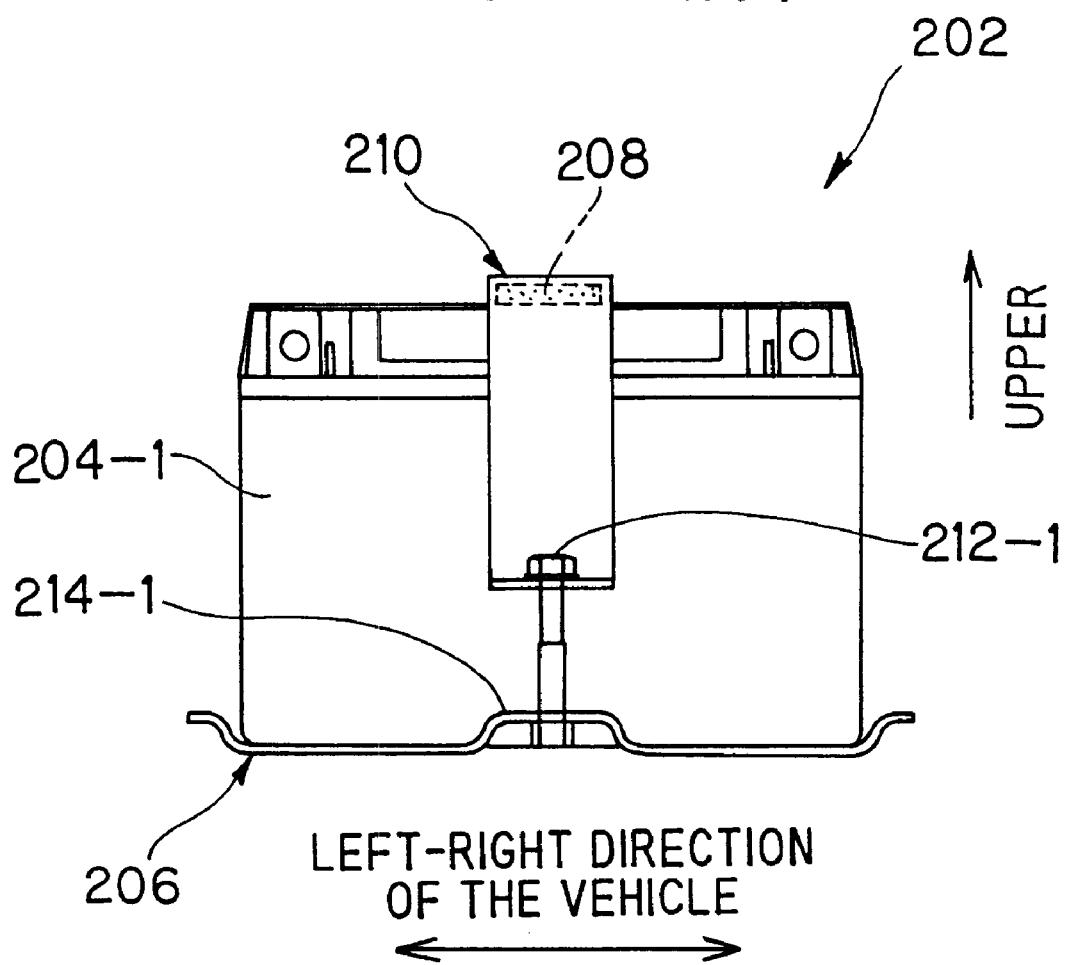
FIG. 24 is a left side elevational view of the battery unit of FIG. 23.

FIG. 21 shows a specific constitution of the present invention as an eighth embodiment of the invention.

The eighth embodiment is characterized in that a dovetail engaging groove 94 is formed at upper part of a cover 22 of each battery 6 in a direction parallel with batteries 6, and an engaging member 96 is engaged with and inserted into groove 94.

According to the structure of the eighth embodiment, each battery 6 has the upper engaging groove 94 in which the engaging member 96 is inserted, thereby integrally maintaining the batteries and securely fixing each battery 6. The engaging groove 94 is thus formed at upper part of the cover 22 of each battery 6 and has the engaging member 96 inserted therein, thereby simplifying the structure and making same easier to assemble.

It is noted in the eighth embodiment that positioning must be done after the engaging member 96 is inserted into the engaging groove 94. For example, the engaging member 96 is formed to have a through-hole therein into which a fixing pin is inserted, or a groove therein into which a fixing E-ring is attached. It is preferable that the bottom of the batteries 6 be fixed by another method such as in the fifth embodiment, since movement of the batteries is restricted only in one direction.

In one embodiment, each engaging member 96 can initially be inserted into a groove 94 of a respective battery 6. Once the batteries 6 are positioned on the tray, each of the engaging members 96 can be slid sidewardly into the open end of the groove 94 of the adjacent battery 6 and fixed into position with a pin or other fixing structure.

As is clear from the detailed description of the invention, a U-shaped bolt engaging with said bead section is provided such that both ends of said fixing member and a portion of the fixing member between said batteries are fixed to said battery tray, and the portion of said U-shaped bolt engaging with said bead section is disposed within a groove of said bead section.

Accordingly, the portion of said U-shaped bolt engaging with said bead section is disposed within a groove at the bottom of the battery tray, and said fixing member portion between said batteries is fixed to said battery tray. Accordingly, the U-shaped bolt does not protrude from the battery tray bottom.

In addition, looseness of fixing members does not occur, enabling the middle battery on the battery tray to be fixed.

Although particular preferred embodiments of the invention have been disclosed in detail for illustrative purposes, it will be recognized that variations or modifications of the disclosed apparatus, including the rearrangement of parts, lie within the scope of the present invention.

I claim:

1. A battery fixing structure of a vehicle including a battery tray mounted therein with a plurality of batteries disposed on said battery tray, said fixing structure comprising: an upwardly projecting bead section disposed at the bottom of said battery tray between adjacent ones of said batteries; a fixing member with a buffer material disposed atop said batteries and having opposite ends fixed to said tray, said fixing member having a pair of sidewardly projecting flanges extending in a transverse direction of said tray between said adjacent batteries, each said flange defining an opening therein; and a U-shaped bolt having a first portion disposed within a groove of said bead section, and a pair of second portions connected to said first portion and having ends disposed within the respective openings of said flanges to fix said tray to said fixing member in an area thereof disposed between said adjacent batteries.

2. A battery fixing structure of a vehicle according to claim 1 wherein the battery tray defines an air vent portion to cool the batteries.

3. A battery fixing structure of a vehicle according to claim 1 wherein the bead section projects upwardly from said battery tray and said groove opens downwardly on the bottom of said tray, said first portion of said U-shaped bolt being disposed within said groove such that said first portion does not project downwardly beyond the bottom of said battery tray.

4. A battery fixing structure of a vehicle according to claim 3 wherein said second portions are oriented in an upright manner and are connected to one another by said first portion which extends therebetween, and said second portions each project upwardly through respective transversely-spaced holes defined in said bead section.

5. A battery fixing structure of a vehicle according to claim 1 wherein said buffer material is disposed between tops of the batteries and said fixing member.

6. A battery fixing structure of a vehicle according to claim 1, wherein said flanges extend in a direction which is generally parallel with said bead section.

7. A battery fixing structure for a vehicle having a plurality of batteries, said fixing structure comprising a battery tray on which said batteries are disposed in side-by-side relation with one another, said battery tray defining an upwardly projecting and elongate bead on a bottom of said tray extending between an adjacent pair of said batteries, said bead defining a groove therein which opens downwardly, a fixing member disposed atop said batteries and having a pair of flanges which project sidewardly in opposite directions from one another, said flanges extending between said adjacent pair of batteries in a direction generally parallel to said bead, and a U-shaped bolt having a first lower portion engaged within said groove of said bead and laterally spaced second portions joined to respective opposite ends of said first portion and projecting upwardly therefrom through said tray between said adjacent pair of batteries, said second portions having free ends which are fixed to the respective flanges disposed between said adjacent pair of batteries.

8. The battery fixing structure of claim 7 wherein said fixing member comprises an elongate band which extends across upper portions of said batteries and has opposite ends fixed to opposite end edges of said tray, said flanges projecting sidewardly from opposite sides of said band between said adjacent pair of batteries and being spaced above said bead and oriented in generally parallel relation therewith.

9. The battery fixing structure of claim 8 wherein said tray has an elongated shape defining a longitudinal dimension and said bead extends along said tray in a direction which is transverse to said longitudinal dimension, said band extending along the entire extent of said longitudinal dimension of said tray atop central portions of said batteries and having a pair of legs which project generally downwardly over upright sides of said batteries, said legs respectively terminating at said ends, said ends defining outwardly and sidewardly projecting flanges which are fixed to respective flanges defined at said opposite end edges of said tray.

10. The battery fixing structure of claim 9 wherein said tray is oriented in the vehicle so that said longitudinal dimension thereof extends in a front-to-back direction of the vehicle, and three said batteries are positioned on said tray in side-by-side relation in the front-to-back direction of the vehicle, said tray defining thereon a pair of said beads which extend transversely across said tray between each adjacent pair of said batteries.

11. The battery fixing structure of claim 7 wherein opposite terminal ends of said fixing member are fixed to said tray at opposite sides thereof.

12. The battery fixing structure of claim 7 wherein a buffer material is disposed between upper portions of said batteries and said fixing member.

13. The battery fixing structure of claim 7 wherein said first portion of said U-shaped bolt is disposed entirely within said groove such that said U-shaped bolt does not project downwardly beyond said bottom of said tray.

14. The battery fixing structure of claim 7 wherein said bead defines therein transversely spaced openings through which the respective second portions of said U-shaped bolt project.

* * * * *